(12) United States Patent
Tanizawa et al.

(10) Patent No.: US 7,984,159 B2
(45) Date of Patent: Jul. 19, 2011

(54) APPARATUS, METHOD, AND TERMINAL APPARATUS FOR MAINTAINING CONNECTION

(75) Inventors: Yoshimichi Tanizawa, Kanagawa (JP); Naoki Esaka, Kanagawa (JP); Tsutomu Shibata, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1019 days.

(21) Appl. No.: 11/882,712

(22) Filed: Aug. 3, 2007

(65) Prior Publication Data

US 2008/0171564 A1 Jul. 17, 2008

(30) Foreign Application Priority Data

Jan. 15, 2007 (JP) .................. 2007-005845

(51) Int. Cl.
*G06F 15/173* (2006.01)
(52) U.S. Cl. ...................................... 709/227
(58) Field of Classification Search .................. 709/227, 709/230, 223
See application file for complete search history.

(56) References Cited

U.S. PATENT DOCUMENTS

| 7,020,707 | B2* | 3/2006 | Sternagle | 709/230 |
| 7,184,418 | B1* | 2/2007 | Baba et al. | 370/331 |
| 7,518,987 | B2* | 4/2009 | Biswas et al. | 370/221 |
| 7,631,093 | B2* | 12/2009 | Sternagle | 709/230 |
| 7,852,859 | B2* | 12/2010 | Wengrovitz et al. | 370/397 |

FOREIGN PATENT DOCUMENTS

| JP | 3492950 | 11/2003 |
| JP | 2005-27318 | 1/2005 |
| JP | 2005-269217 | 9/2005 |
| JP | 2006-59321 | 3/2006 |
| JP | 2006-345231 | 12/2006 |

OTHER PUBLICATIONS

J. Rosenberg et al., "SIP: Session Initiation Protocol," The Internet Society, Network Working Group, Standards Track, Request for Comments: 3261, http://www.ietf.org./rfc/rfc3261.txt, pp. 1-269, (Jun. 2002).
Notice of Rejection issued by the Japanese Patent Office on Nov. 2, 2010, for Japanese Patent Application No. 2007-005845, and English-language translation thereof.

* cited by examiner

*Primary Examiner* — David Y Eng
(74) *Attorney, Agent, or Firm* — Finnegan, Henderson, Farabow, Garrett & Dunner, L.L.P.

(57) ABSTRACT

The resource controlling unit controls a resource usage state. The receiving unit receives from a first terminal a first message containing a first condition for maintaining a connection that is used to transfer a message exchanged between the first terminal and the second terminal. Based on the first condition contained in the received first message and the resource usage state, the determining unit determines a second condition that is to be accepted for maintaining the connection. The adding unit adds the second condition to the first message. The transmitting unit transmits the first message to which the second condition is added to an external device or the second terminal. The maintaining unit maintains the connection under the second condition.

16 Claims, 18 Drawing Sheets

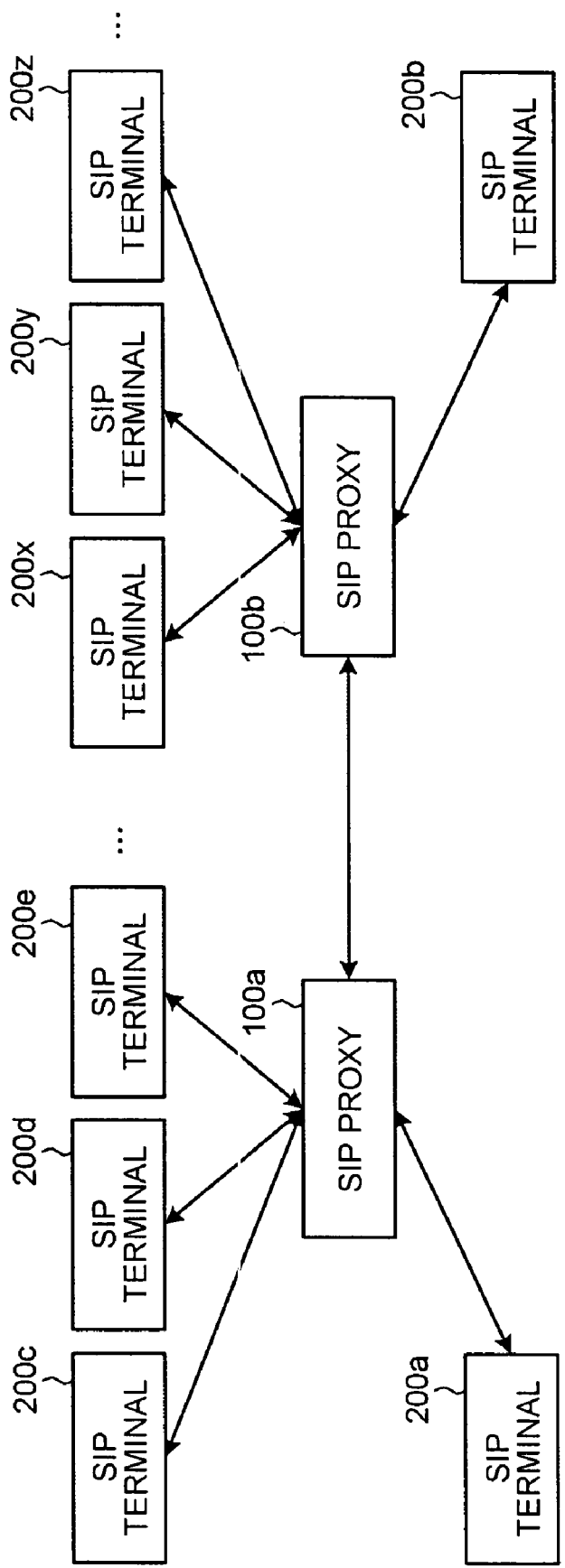

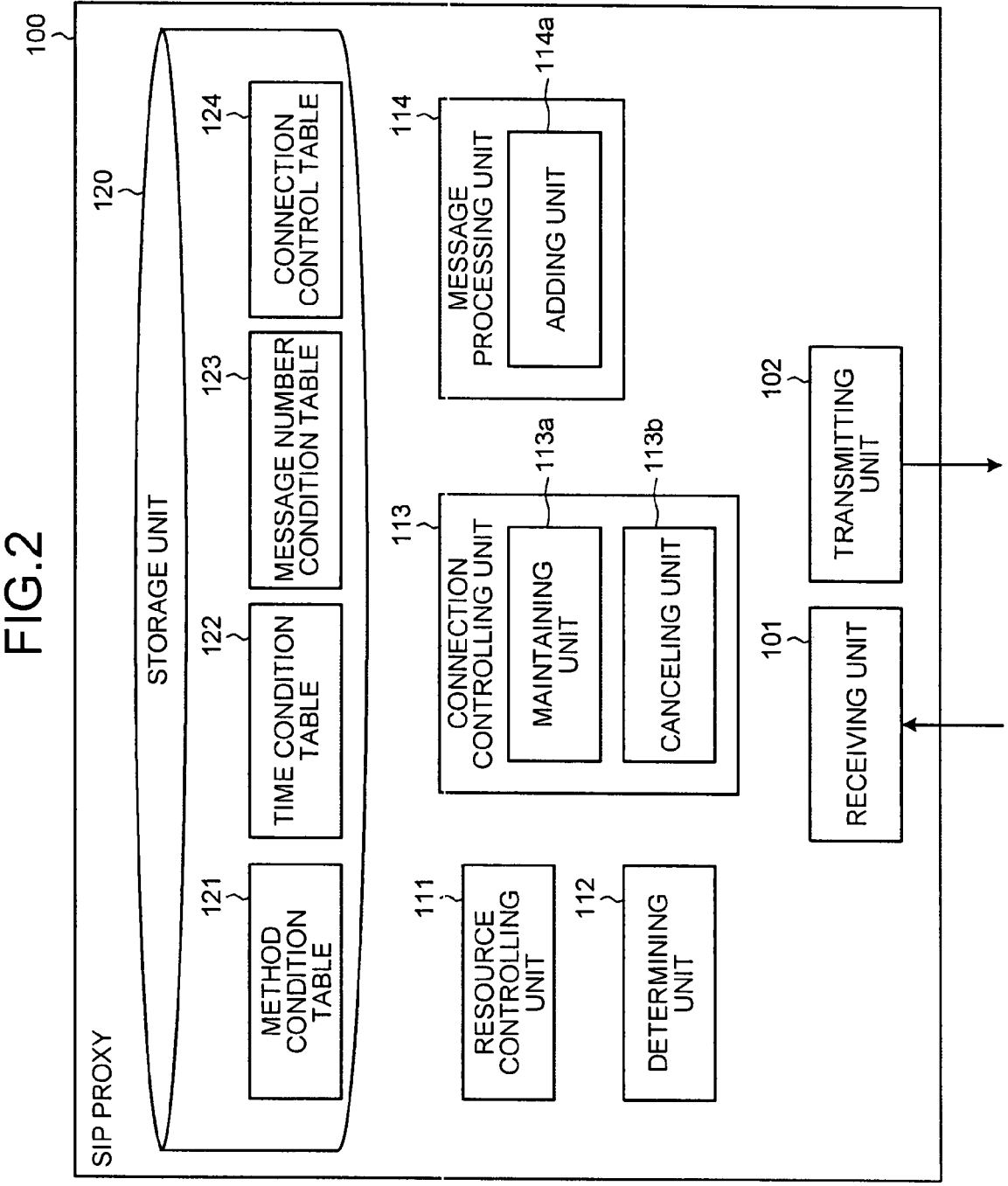

| CONNECTION DESTINATION | SIP METHOD CONDITION |
|---|---|
| proxyB.example.com:5061 | BYE |
| termA.example.com:12341 | NOTIFY |
| termZ.example.com:12342 | CANCEL |

| CONNECTION DESTINATION | TIME CONDITION |
|---|---|
| proxyB.example.com:5061 | 3600 sec |
| termA.example.com:12341 | 1200 sec |
| termZ.example.com:12342 | 300 sec |

| CONNECTION DESTINATION | SIP MESSAGE NUMBER CONDITION |
|---|---|
| proxyB.example.com:5061 | 500 Messages |
| termA.example.com:12341 | 800 Messages |
| termZ.example.com:12342 | 50 Messages |

FIG.6

| CONNECTION DESTINATION | TLS CONNECTION ID | TRANSACTION ID | DIALOG ID | FREQUENCY OF USE | STARTING TIME | NUMBER OF MESSAGES |
|---|---|---|---|---|---|---|
| proxyB.example.com:5061 | 001 | 0011 | 000111 | 1 | 12:00:00 | 250 |
| termA.example.com:12341 | 002 | 0022 | 000222 | 2 | 12:30:00 | 600 |
| termZ.example.com:12342 | 003 | 0033 | 000333 | 3 | 12:45:30 | 40 |

```
INVITE SIPs:userB@proxyB.example.com ; conn-stat-req=cont 500 Messages SIP/2.0   801
Via: SIP/2.0/TLS termA.example.com; branch=z9hG4BKhoge
Max-Forwards: 70
To: Bob <SIPs:userB@proxyB.example.com ; conn-stat-req=cont 500 Messages>        802
From: Alice <SIPs:userA@proxyA.example.com>; tag=112233
Call-ID: 1234567890
CSeq: 222 INVITE
Contact: <SIPs:userA@termA.example.com>
Content-Type: application/sdp
Require: CONN-STAT    803
Proxy-Require: CONN-STAT    804
Content-Length: 142
```

FIG.9

```
INVITE SIPs:userB@proxyB.example.com ; conn-stat-req=cont 500 Messages SIP/2.0
Via: SIP/2.0/TLS proxyA.example.com; branch=z9hG4BK11112
Via: SIP/2.0/TLS termA.example.com; branch=z9hG4BK11111
Max-Forwards: 69
To: Bob <SIPs:userB@proxyB.example.com ; conn-stat-req=cont 500 Messages>
From: Alice <SIPs:userA@proxyA.example.com>; tag=112233
Call-ID: 1234567890
CSeq: 222 INVITE
Contact: <SIPs:userA@termA.example.com>
Content-Type: application/sdp
Require: CONN-STAT
Proxy-Require: CONN-STAT
Conn-cont: SIP/2.0/TLS proxyA.example.com cont 500 Messages  ─── 901
Content-Length: 142
```

FIG.10

```
INVITE SIPs:userB@termB.example.com ; conn-stat-req=cont 500 Messages SIP/2.0
Via: SIP/2.0/TLS proxyB.example.com; branch=z9hG4BK11113
Via: SIP/2.0/TLS proxyA.example.com; branch=z9hG4BK11112
Via: SIP/2.0/TLS termA.example.com; branch=z9hG4BK11111
Max-Forwards: 68
To: Bob <SIPs:userB@proxyB.example.com ; conn-stat-req=cont 500 Messages>
From: Alice <SIPs:userA@proxyA.example.com>; tag=112233
Call-ID: 1234567890
CSeq: 222 INVITE
Contact: <SIPs:userA@termA.example.com>
Content-Type: application/sdp
Require: CONN-STAT
Proxy-Require: CONN-STAT
Conn-cont: SIP/2.0/TLS proxyB.example.com cont 500 Messages
Conn-cont: SIP/2.0/TLS proxyA.example.com cont 500 Messages
Content-Length: 142
```

```
SIP/2.0 200 OK
Via: SIP/2.0/TLS proxyB.example.com; branch=z9hG4BK11113
Via: SIP/2.0/TLS proxyA.example.com; branch=z9hG4BK11112
Via: SIP/2.0/TLS termA.example.com; branch=z9hG4BK11111
To: Bob <SIPs:userB@proxyB.example.com ; conn-stat-req=cont 500 Messages>
From: Alice <SIPs:userA@proxyA.example.com>; tag=112233
Call-ID: 1234567890
CSeq: 222 INVITE
Contact: <SIPs:userB@termB.example.com>
Content-Type: application/sdp
Require: CONN-STAT
Proxy-Require: CONN-STAT
Conn-cont: SIP/2.0/TLS termB.example.com cont 500 Messages
Conn-cont: SIP/2.0/TLS proxyB.example.com cont 500 Messages
Conn-cont: SIP/2.0/TLS proxyA.example.com cont 500 Messages
Content-Length: 142
```

```
SIP/2.0 200 OK
Via: SIP/2.0/TLS proxyA.example.com; branch=z9hG4BK11112
Via: SIP/2.0/TLS termA.example.com; branch=z9hG4BK11111
To: Bob <SIPs:userB@proxyB.example.com ; conn-stat-req=cont 500 Messages>
From: Alice <SIPs:userA@proxyA.example.com>; tag=112233
Call-ID: 1234567890
CSeq: 222 INVITE
Contact: <SIPs:userB@termB.example.com>
Content-Type: application/sdp
Require: CONN-STAT
Proxy-Require: CONN-STAT
Conn-cont: SIP/2.0/TLS termB.example.com cont 500 Messages
Conn-cont: SIP/2.0/TLS proxyB.example.com cont 500 Messages
Conn-cont: SIP/2.0/TLS proxyA.example.com cont 500 Messages
Content-Length: 142
```

```
SIP/2.0 200 OK
Via: SIP/2.0/TLS termA.example.com; branch=z9hG4BK11111
To: Bob <SIPs:userB@proxyB.example.com ; conn-stat-req=cont 500 Messages>
From: Alice <SIPs:userA@proxyA.example.com>; tag=112233
Call-ID: 1234567890
CSeq: 222 INVITE
Contact: <SIPs:userB@termB.example.com>
Content-Type: application/sdp
Require: CONN-STAT
Proxy-Require: CONN-STAT
Conn-cont: SIP/2.0/TLS termB.example.com cont 500 Messages
Conn-cont: SIP/2.0/TLS proxyB.example.com cont 500 Messages
Conn-cont: SIP/2.0/TLS proxyA.example.com cont 500 Messages
Content-Length: 142
```

1301  
1302

APPARATUS, METHOD, AND TERMINAL APPARATUS FOR MAINTAINING CONNECTION

CROSS-REFERENCE TO RELATED APPLICATIONS

This application is based upon and claims the benefit of priority from the prior Japanese Patent Application No. 2007-5845, filed on Jan. 15, 2007; the entire contents of which are incorporated herein by reference.

BACKGROUND OF THE INVENTION

1. Field of the Invention

The present invention relates to an apparatus, a method, and a terminal apparatus for maintaining a connection in communications that are being relayed.

2. Description of the Related Art

These years, the session initiation protocol (SIP) has been widely known as a signaling protocol used for controlling and relaying communications between communication devices. A communication system adopting the SIP (SIP system) includes an SIP proxy as a server mediating communications between SIP terminals, which are terminal apparatuses. Security is protected commonly by adopting a transport layer security (TLS) protocol as a transport protocol for connecting the SIP terminals and the SIP proxy. A set of SIP terminals and an SIP proxy is designated as an SIP entity.

An SIP terminal is connected to a specific SIP proxy and always sends and receives SIP messages by way of this particular SIP proxy. Such a SIP proxy is called an outbound proxy.

For instance, it is assumed that an outbound proxy for SIP terminal A is SIP proxy A and an outbound proxy for SIP terminal B is SIP proxy B. An SIP message sent from SIP terminal A to SIP terminal B always leaves SIP terminal A, passes through SIP proxy A and SIP proxy B, and is transferred to SIP terminal B. Such a communication model is designated generally as an SIP trapezoidal communication model.

In an SIP entity in a conventional SIP system, a transaction or dialog period, which is a period of basic message exchange in accordance with the SIP, is brought into synchronism with a TLS connection maintaining period.

The synchronization between the transaction period and the TLS connection maintaining period is explained in detail below. In general, the SIP messages are exchanged in units of transactions. A transaction includes an SIP request message that an SIP transmitting terminal sends to an SIP receiving terminal and an SIP response message that the SIP receiving terminal sends back to the SIP transmitting terminal upon receipt of the SIP request message.

When a TLS connection is maintained in units of transactions, an SIP entity detects a transaction of an SIP message, and establishes, when an SIP request message is transmitted, a TLS connection with the SIP entity to which the SIP request message is to be transferred. After an SIP response message is transmitted, the TLS connection to the SIP entity to which the message is transferred is canceled.

Next, the synchronization between the dialog period and the TLS connection maintaining period is explained in detail below. A dialog indicates a relationship between SIP terminals starting when a media session is brought about by an SIP message between the SIP transmitting terminal and the SIP receiving terminal and maintained until the media session ends. At the beginning of the media session, the SIP terminals exchange SIP INVITE messages. At the end of the media session, the SIP terminals exchange SIP BYE messages.

When the TLS connection is to be maintained in units of dialogs, an SIP entity detects an SIP dialog, and establishes the TLS connection to an SIP entity to which an SIP INVITE message is transferred at the time of the message exchange. The TLS connection is maintained during the dialog. After an SIP BYE message is exchanged, the TLS connection to the SIP entity to which the message is transferred is canceled.

In a conventional system, the TLS connection maintaining period is brought into synchronism with the transaction period or the dialog period for SIP messages.

Memories and other calculation resources are taken up while a TLS connection is established. Especially for an SIP proxy that has connections with a number of SIP terminals, it becomes difficult to maintain all the TLS connections with the SIP terminals. On the other hand, because it takes time to establish a TLS connection, it is preferable to maintain as many of the TLS connections as possible to reduce delay time in transferring SIP messages. Thus, a trade-off between a reduction in resource consumption and a reduction in transfer delay has to be made when establishing TLS connections.

For instance, when there are not so many SIP terminals connected to an SIP proxy, resource consumption does not raise any issue. Hence, even after a transaction or a dialog is completed, the TLS connection may still be maintained. In reality, such implementations are often offered.

In contrast, when a number of SIP terminals are connected to a single SIP proxy, the SIP proxy may not be able to keep all the TLS connections, depending on the use of SIP applications running on the SIP terminals. If this is the case, the SIP proxy selects, for example, the TLS connection in the least use among the ones that are currently maintained, and cancels this TLS connection. The TLS connections of frequent use can be thereby maintained.

J. Rosenberg et al. specify in "RFC 3261, SIP: Session Initiation Protocol", [online], June 2002, retrieved from the Internet: <URL: http://www.ietf.org/rfc/rfc3261.txt> (hereinafter, "Document 1") that the connection should be maintained for a certain period of time and that, when the connection is terminated at the transport from which an SIP message is transmitted, a connection should be newly established. More specifically, it is indicated that the connection at the transport for transferring the SIP message (TCP or TLS connection) is maintained preferably for 64×T1 seconds after the last message is transmitted/received by way of the established connection. T1 denotes a predicted value for a round trip time (RTT), whose default value is 500 milliseconds.

In addition, Document 1 indicates that, when sending an SIP response message, the connection established when the SIP request message is sent out is used to transfer the SIP response message and that, if this connection has been terminated, a connection should be newly established.

When an SIP entity wants a particular TLS connection to be maintained, the SIP entity is allowed to make a request of maintaining the connection to the connected SIP entity by, for example, sending a keep-alive message thereto.

There is a problem in the method suggested by Document 1 and others, however, that all the connection channels among the SIP entities cannot be suitably maintained in an SIP trapezoidal communication model. For instance, a method incorporating a keep-alive message is intended mainly to maintain a single TLS connection between two SIP entities only. Thus, in this method the maintenance of all three TLS connections established among four SIP entities in a SIP trapezoidal communication model cannot be requested.

Furthermore, the method adopting keep-alive messages increases the amount of traffic, and thus the method is unusable for an SIP proxy to which multiple SIP terminals are connected.

In addition, with the method determining which TLS connection to be maintained based on frequency of use, connections may not be properly maintained if TLS connections to be maintained should not be determined in accordance with frequency of use only. For instance, there are cases in which a connection is terminated for a transaction or a dialog with an SIP application that is not in frequent use but requires high responsivity, while an unnecessary TLS connection is maintained.

SUMMARY OF THE INVENTION

According to one aspect of the present invention, a server apparatus that maintains a connection between a first terminal and a second terminal, transmits a message received from the first terminal to the second terminal by way of a relaying device, receives a message transmitted from the second terminal by way of the relaying device, and transmits the message to the first terminal, the server apparatus includes a resource controlling unit configured to control a resource usage state; a receiving unit configured to receive from the first terminal a first message containing a first condition for maintaining the connection between the first terminal and the second terminal; a determining unit configured to determine a second condition to be accepted to maintain the connection, based on the first condition contained in the received first message and the resource usage state; an adding unit configured to add the second condition to the first message; a transmitting unit configured to transmit the first message to which the second condition is added, to the relaying device to transmit the first message to the second terminal; and a maintaining unit configured to maintain the connection under the determined second condition.

According to another aspect of the present invention, a connection maintaining method used for a server apparatus that maintains a connection between a first terminal and a second terminal, transmits a message received from the first terminal to the second terminal by way of a relaying device, receives a message transmitted from the second terminal by way of the relaying device, and transmits the message to the first terminal, the method includes controlling a resource usage state; receiving from the first terminal a first message containing a first condition for maintaining the connection between the first terminal and the second terminal; determining a second condition to be accepted to maintain the connection, based on the first condition contained in the received first message and the resource usage state; adding the second condition to the first message; transmitting the first message to which the second condition is added, to the relaying device to transmit the first message to the second terminal; and maintaining the connection under the determined second condition.

According to still another aspect of the present invention, a terminal apparatus that communicates with an external terminal by a connection maintained to transmit a message to the external terminal by way of a relaying device, the terminal apparatus includes a resource controlling unit configured to control a resource usage state; a determining unit configured to determine a first condition to be accepted to maintain a connection for transmitting a message to and from the external terminal, based on the resource usage state; a transmitting unit configured to transmit a first message containing the determined first condition to the relaying device; and a receiving unit configured to receive from the relaying device a second message containing a second condition requested for maintaining the connection by at least either one of the external terminal and the relaying device, the second message being transmitted by the external terminal in response to the first message, wherein the determining unit is further configured to determine the first condition based on the received second condition and the resource usage state.

BRIEF DESCRIPTION OF THE DRAWINGS

FIG. 1 is a block diagram illustrating the entire structure of a communication system including a server apparatus according to an embodiment of the present invention;

FIG. 2 is a block diagram illustrating the detailed structure of a SIP proxy;

FIG. 3 is an explanatory diagram illustrating an example of a data structure of a method condition table;

FIG. 4 is an explanatory diagram illustrating an example of a data structure of a time condition table;

FIG. 5 is an explanatory diagram illustrating an example of a data structure of a message number condition table;

FIG. 6 is an explanatory diagram illustrating an example of a data structure of a connection control table;

FIG. 8 is an explanatory diagram illustrating an example of an SIP Invite request that is to be transmitted;

FIG. 9 is an explanatory diagram illustrating an example of an SIP Invite request that is to be transferred;

FIG. 10 is an explanatory diagram illustrating an example of an SIP Invite request that is to be transferred;

FIG. 11 is an explanatory diagram illustrating an example of an SIP Invite response that is to be transmitted;

FIG. 12 is an explanatory diagram illustrating an example of an SIP Invite response that is to be transferred;

FIG. 13 is an explanatory diagram illustrating an example of an SIP Invite response that is to be transferred;

DETAILED DESCRIPTION OF THE INVENTION

Figure 7:
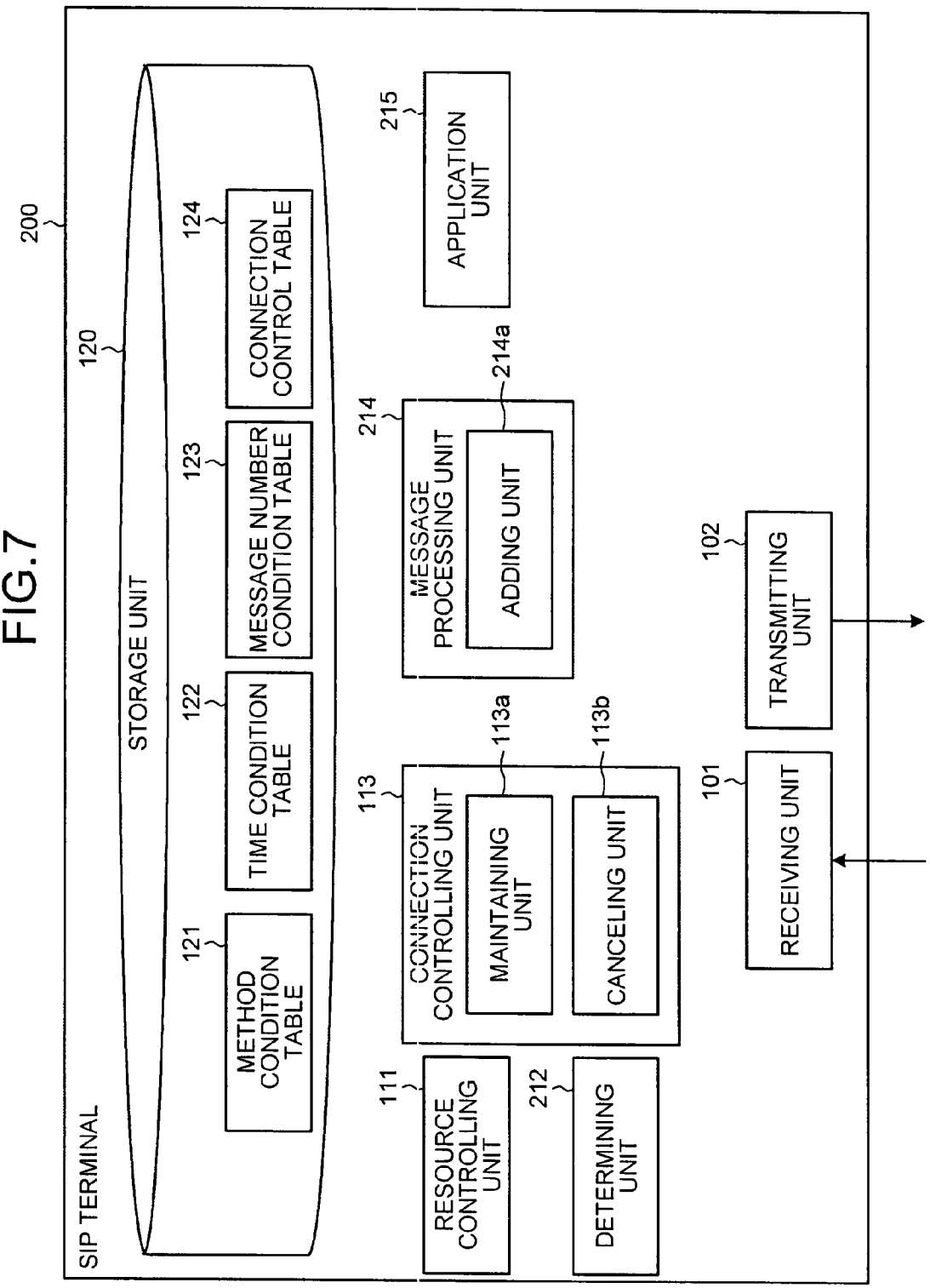
FIG. 7 is a block diagram illustrating a detailed structure of an SIP terminal.

Exemplary embodiments of an apparatus, a method, and a terminal apparatus for maintaining a connection according to the present invention are explained in detail below with reference to the attached drawings.

As discussed above, there is a problem in the conventional method that all the connections among SIP entities cannot be suitably maintained. More specifically, a problem as described below often arises.

To maintain TLS connections and achieve high responsivity, it is preferable to determine continuation/termination of a TLS connection in accordance with a type of an application running on the SIP terminal on the transmitter or receiver side and a request sent by the SIP terminal.

For instance, when a text message is transmitted and received between certain SIP terminals on a text-message exchanging application, it is preferable that the TLS connections used for a transaction of transferring such a message are maintained among all the devices through which the message is passed so that the responsivity of the application can be kept high.

On the other hand, when a text message is broadcasted to all the terminals that are included in a system, it is unnecessary to keep the TLS connections among all the terminals. Thus, the TLS connections should be terminated as soon as the transaction is completed.

In the conventional method, however, the TLS connection maintaining period cannot be determined in response to individual requests from different applications.

Moreover, three TLS connections need to be maintained in SIP-message exchange, among the SIP transmitting terminal that sends the SIP message out, the two SIP proxies that relay the SIP message, and the SIP receiving terminal. Thus, the continuation/termination of the TLS connections should not be determined in consideration of a sole SIP entity but of the conditions of the TLS connections among other SIP entities. However, a technique of realizing such has not been available in the conventional method.

To solve such a problem, a server apparatus according to an embodiment of the present invention receives from a terminal apparatus a message that includes a connection maintaining condition request, determines whether the maintaining condition is acceptable in consideration of the condition of its resource being used, and transfers the determination result to an external apparatus, which is a message relaying destination.

As shown in FIG. 1, a communication system according to an embodiment includes multiple SIP proxies 100a and 100b and multiple SIP terminal 200a, 200b, 200c, 200d, 200e, 200x, 200y, and 200z.

More specifically, an SIP trapezoidal communication model is constituted, where any two of the SIP terminals 200 are used as a transmission terminal and a reception terminal, and communications are performed via the two SIP proxy 100a and 100b. Because the SIP proxies 100a and 100b have the same function, they may be referred to simply as SIP proxy 100. In a similar manner, the SIP terminals 200a to 200z may be referred to as SIP terminal 200. It should be noted that what is illustrated in FIG. 1 is not physical connections of the SIP entities but a relationship thereof for SIP-message exchange.

The following explanation focuses on an example of an SIP system using the SIP. However, the present invention is not limited to the SIP system but is applicable to any communication system configured to send and receive messages among terminals via multiple devices.

The SIP proxy 100 is a relay server that transfers SIP messages between SIP terminals 200. An SIP terminal 200 selects a specific SIP proxy 100 as an outbound proxy. The SIP terminal 200 always sends and receives SIP messages via the outbound proxy.

The TLS connection between the SIP proxy 100a and the SIP proxy 100b may be newly established for each pair of an SIP receiving terminal 200 and an SIP transmitting terminal 200 for a dialog. Otherwise, a sole TLS connection may be established and used to transfer all the SIP messages. The structure of the SIP proxy 100 will be described later.

The SIP terminal 200 is a terminal apparatus that runs an SIP application using the SIP as a signaling protocol. Typical examples of SIP applications include client software programs for an advanced functional IP telephone terminal and text-messaging services. The structure of the SIP terminal 200 will be described later.

The structure of the SIP proxy 100 is now explained. As illustrated in FIG. 2, the SIP proxy 100 includes a storage unit 120, a receiving unit 101, a transmitting unit 102, a resource controlling unit 111, a determining unit 112, a connection controlling unit 113, and a message processing unit 114.

The storage unit 120 stores therein various types of information that is referred to during a process of maintaining a TLS connection. The storage unit 120 includes a method condition table 121, a time condition table 122, a message number condition table 123, and a connection control table 124.

The method condition table 121, the time condition table 122, and the message number condition table 123 stores therein conditions determined by the determining unit 112, which will be described later, for maintaining the TLS connection. The information stored in each table may be put together into a single condition table, or part of the information may be stored therein.

The method condition table 121 stores therein a condition for maintaining the TLS connection that is specified by a method implemented in accordance with the SIP (SIP method condition).

As illustrated in FIG. 3, the method condition table 121 stores therein connection destinations indicating the addresses and ports of connected SIP entities, and SIP method conditions for terminating TLS connections. For instance, the first item in the record indicates an SIP method condition where the TLS connection should be maintained until a process of transferring an SIP BYE message to the SIP proxy 100 identified by "proxyB.example.com:5061" is completed.

The time condition table 122 stores therein conditions for maintaining TLS connections which are determined in accordance with a length of time that each TLS connection is maintained (time conditions).

As shown in FIG. 4, the time condition table 122 stores therein connection destinations and time conditions determining the duration of time that the TLS connection is to be maintained. For instance, the first item in the record specifies a time condition that the TLS connection is maintained for 3600 seconds after the TLS connection is established.

The message number condition table 123 stores therein conditions for maintaining TLS connections determined by the number of SIP messages transmitted and received via each TLS connection (SIP message number conditions).

As illustrated in FIG. 5, the message number condition table 123 stores therein connection destinations and SIP message number conditions determining the number of messages transferred, which is used as a threshold value for terminating the TLS connection. For example, the first item in the record indicates an SIP message number condition that the TLS connection is maintained until 500 messages are transmitted/received by way of the established connection.

The connection control table 124 stores therein information regarding TLS connections that are maintained.

As illustrated in FIG. 6, the connection control table 124 stores therein, as information related to the TLS connections, connection destinations, TLS connection IDs for identifying the TLS connections, transaction IDs for identifying transactions dialog IDs for identifying dialogs, frequency of use, starting times of the TLS connections, and the number of messages transmitted/received by way of the TLS connections, in connection with one another.

The frequency of use is updated, for example, when a packet is transmitted by way of the TLS connection. The starting time is referred to when the connection maintaining condition is designated as the time condition, to determine whether the time condition is met by calculating the time elapsed from the beginning of the connection. Similarly, the number of messages is referred to when the connection maintaining condition is designated as the SIP message number condition, to determine whether the number of messages transmitted/received by way of the connection exceeds a predetermined condition.

The storage unit 120 can be constituted by any recording medium that is commonly used, such as a hard disk drive (HDD), an optical disk, a memory card, and a random access memory (RAM).

The receiving unit 101 receives packets containing SIP messages from other SIP entities such as SIP terminals 200 and other SIP proxies 100. The receiving unit 101 designates which TLS connection to be used when receiving a packet, by using the connection controlling unit 113. If a new TLS connection needs to be established to receive a packet, the receiving unit 101 sends a request to the connection controlling unit 113 to achieve the TLS connection.

The transmitting unit 102 transmits packets containing SIP messages to other SIP entities. The transmitting unit 102 also designates which TLS connection to be used when transmitting a packet, by using the connection controlling unit 113. If a new TLS connection needs to be established to transmit a packet, the transmitting unit 102 sends a request to the connection controlling unit 113 to achieve the TLS connection.

The resource controlling unit 111 controls the state of use of the calculation resources for the establishment of TLS connections. The resource controlling unit 111 specially controls the amount of memory usage for the TLS connections. The calculation resources controlled by the resource controlling unit 111 is not limited to the amount of memory usage, but any calculation resource, such as rate of utilization of the central processing unit (CPU) may be adopted as a target for control.

The determining unit 112 determines a condition acceptable for the apparatus itself to maintain the TLS connections, based on a request of connection maintaining condition extracted by message processing unit 114 as described later from the header of an SIP message received from an SIP entity, and also on the usage of the resource of the apparatus itself. The determining unit 112 may determine not to continue the connection when it judges the resource usage state does not allow the connection to be maintained.

The connection controlling unit 113 includes a maintaining unit 113a and a canceling unit 113b, and controls the TLS connections that are used during packet transmission/reception.

When the determining unit 112 determines to maintain a TLS connection, the maintaining unit 113a maintains the TLS connection in accordance with the determined condition. Any method of maintaining TLS connections that is conventionally used may be employed. For instance, the maintaining unit 113a may be configured in such a manner that, when a function of canceling a TLS connection with a low frequency of use by looking up the frequency of use stored in the connection control table 124 is provided, the cancellation of the connection can be avoided by regularly updating the table so that the frequency of use may increase.

The canceling unit 113b cancels a TLS connection when the determining unit 112 determines not to continue the TLS connection or when the condition for maintaining the TLS connection is not satisfied.

The canceling unit 113b may be provided with a function of, when receiving a notification of the memory capacity being tight from the resource controlling unit 111, selecting a connection with the lowest frequency of use from the TLS connections currently in control and canceling the selected connection.

The connection controlling unit 113 has a function of establishing a new TLS connection when receiving a request for a new TLS connection from the receiving unit 101 or the transmitting unit 102.

The message processing unit 114 executes various processes on transmitted/received SIP messages in accordance with SIP protocol specifications. More specifically, the message processing unit 114 receives an SIP message from the receiving unit 101 and reconstitutes the header of the SIP message in accordance with the SIP protocol specifications to transfer the SIP message. The message processing unit 114 sends the reconstructed SIP message to the transmitting unit 102 to transfer it to the target SIP entity.

The message processing unit 114 may be configured in such a manner as to issue to the connection controlling unit 113 an instruction of canceling the connection in accordance with the SIP protocol specifications T1×64 seconds after a dialog or a transaction is completed. As mentioned above, T1 is a predicted value for RTT, where its default value is 500 milliseconds.

The message processing unit 114 according to the embodiment further includes a function of constructing the header of an SIP message in accordance with the SIP protocol format extended for the purpose of the embodiment. More specifically, the message processing unit 114 includes an adding unit 114a that adds a maintaining condition determined by the determining unit 112 based on the usage of the resource in the apparatus itself or the like, to the header of the SIP message that is to be transferred. The extension of the SIP protocol format will be explained in detail later.

The structure of the SIP terminal 200 is now explained in detail. As illustrated in FIG. 7, the SIP terminal 200 includes the storage unit 120, the receiving unit 101, the transmitting unit 102, the resource controlling unit 111, a determining unit 212, the connection controlling unit 113, a message processing unit 214, and an application unit 215.

The functions of the storage unit 120, the receiving unit 101, the transmitting unit 102, the resource controlling unit 111, and the connection controlling unit 113 are the same as the functions of the components of the SIP proxy 100. Thus, these components of the SIP terminal 200 are given the same reference numerals, and the explanation thereof is omitted.

The determining unit 212 determines whether a condition of maintaining a TLS connection requested by the application unit 215 as described later is acceptable, based on the resource usage in the apparatus itself and the connection maintaining condition. When receiving a SIP message containing a maintaining condition from an external SIP terminal 200, the determining unit 212 determines whether the maintaining condition is acceptable, based on the resource usage in the apparatus itself and the maintaining condition.

The determining unit 212 may determine to change the maintaining condition determined at the beginning of the process, with reference to the maintaining condition included in the SIP message sent by another entity in response to the SIP message containing the maintaining condition determined at the beginning of the process.

In the same manner as the message processing unit 114 of the SIP proxy 100, the message processing unit 214 executes various processes on the transmitted/received SIP messages in accordance with the SIP protocol specifications. More specifically, the message processing unit 214 constructs the header and body of an SIP message in response to a request from the application unit 215 for forming an SIP message necessary to run an application. Then, the message processing unit 214 sends such a SIP message to the transmitting unit 102.

The message processing unit 214 also receives an SIP message received by the receiving unit 101, and interprets the header and body of the received SIP message. Then, the message processing unit 214 informs the application unit 215 of necessary information from the content of the interpreted SIP message.

The message processing unit 214 according to the embodiment further includes a function of constructing the header of an SIP message in accordance with the extended SIP protocol format in the same manner as the message processing unit 114 of the SIP proxy 100. For this reason, the message processing unit 214 is provided with an adding unit 214a that has the same function as the adding unit 114a of the message processing unit 114 of the SIP proxy 100.

The application unit 215 executes SIP applications such as IP telephone and text-messaging services. The application unit 215 provides users with various functions of such SIP applications via, for example, a user interface such as a not-shown display device.

An example of an SIP protocol format extended to realize the embodiment is explained with reference to FIGS. 8 to 13.

FIGS. 8 to 10 are diagrams illustrating examples of different SIP Invite requests transmitted and transferred from the SIP terminal 200a to the SIP terminal 200b via the SIP proxies 100a and 100b. FIGS. 11 to 13 are diagrams illustrating examples of different SIP Invite responses transmitted transferred in response to such SIP Invite requests from the SIP terminal 200b to the SIP terminal 200a via the SIP proxies 100b and 100a.

In the following explanation, the SIP Invite request and response are used as examples, but an SIP message that is to be extended is not limited thereto.

First, the extended SIP message includes a value for having the SIP entity identify that the SIP message deals with an extension according to the embodiment. For instance, the SIP message may include a defined option tag "CONN-STAT" as an identifier of this extension in its "Require" header and "Proxy-Require" header.

The SIP entity that receives the SIP message recognizes, when its "Require" header or "Proxy-Require" header contains a "CONN-STAT" tag, that the sender SIP entity of the SIP message uses the extension. If the receiver SIP entity is a conventional one that does not support this extension, when detecting a value that is not identifiable in the "Require" header or "Proxy-Require" header, the SIP entity creates an SIP response message that an incomprehensible extension has been received, in accordance with the SIP protocol specifications, and sends it to the sender SIP entity.

The extended SIP message includes a variable for notifying all the SIP proxies 100 through which the SIP message is passed and the addressee SIP terminal 200 of the maintaining condition that the sender SIP terminal 200 requests regarding a TLS connection that is to be established for the exchange of the SIP message.

This may be realized by defining a parameter that describes the request for the TLS connection maintaining condition and adding it to the SIP-URIs of the "Request-URI" and "To" header fields of the SIP message. For example, "conn-stat-req" is defined as a parameter that is to be added, and a condition for maintaining the TLS connection is described for the value of the parameter.

For instance, a request is made for maintaining the TLS connection while 500 SIP messages are being transferred, the condition may be described in such a form as "conn-stat-req=cont 500 Messages". Moreover, when a request is made for maintaining the TLS connection until an SIP BYE message is exchanged, the condition may be described as "conn-stat-req=cont until BYE". When a request is made for maintaining the TLS connection for 3600 seconds, the condition may be described as "conn-stat-req=cont 3600 sec."

The SIP entity that receives the SIP message refers to the value for the designated parameter "conn-stat-req" and recognizes what kind of request the sender SIP terminal 200 of this SIP message has made regarding the condition of maintaining the TLS connection that is used to transfer the SIP message.

FIG. 8 is a diagram for explaining an example of an SIP Invite request sent by the SIP terminal 200a to the SIP proxy 100a. Maintaining condition requests 801 and 802 (conn-stat-req=cont 500 Messages) are added to the extended SIP Invite request. Furthermore, as identifiers indicating that the extension is included, an option tag 803 (CONN-STAT) is added to the "Require" header and an option tag 804 (CONN-STAT) is added to the "Proxy-Require" header.

The extension of the SIP message that the sender SIP terminal 200 creates and sends out has been described. In addition to the above, the extended SIP message contains values used by the SIP proxies 100 that relay the SIP message and the addressee SIP terminal 200 to notify other SIP entities to which the message is transferred of the response state to the condition of maintaining the TLS connection requested by the sender SIP terminal 200. The response state to the maintaining condition request may be an acceptable maintaining condition judged from the request or information indicating that the request is unacceptable (rejection information).

As a header indicating the response state, for instance, the "Conn-cont" header may be defined and contained in the SIP message. The describing method may be such that the fully qualified domain name (FQDN) of the SIP entity, the type of transport used (such as TLS), and the response state are described for each SIP entity.

For instance, when the TLS connection is maintained as requested by the sender of the SIP message, the description may be "Conn-cont:SIP/2.0/TLS proxyA.example.com cont ok". In place of "ok", the same maintaining condition as the request may be inserted.

If the TLS connection cannot be maintained as requested by the sender of the SIP message but is allowed to be maintained under another condition as described, the description may be "Conn-cont: SIP/2.0/TLS proxyB.example.com cont 400 Messages". This example shows a case in which the maintaining condition has been requested as "cont 500 Messages", but the maintaining condition is tightened to allow the continuation of the connection (the TLS connection is maintained while 400 SIP messages are being transferred).

If, for example, the maintaining condition requested by the sender of the SIP message cannot be accepted, the description of the rejection information may be in the form of "Conn-cont:SIP/2.0/TLS procyC.example.com cont ng".

FIG. 9 is a diagram for explaining an example of an SIP Invite request transferred from the SIP proxy 100a to the SIP proxy 100b. When the message is transferred, a line 901 containing the "Conn-cont" header indicating a response state of the SIP proxy 100b and the value thereof is added to the extended SIP Invite request.

FIG. 10 is a diagram for explaining an example of an SIP Invite request transferred from SIP proxy 100b to the destination SIP terminal 200b. A line 1001 containing the "Conn-cont" header that indicates a further response state of the SIP proxy 100b and the value thereof is added to the extended SIP Invite request. In other words, information describing the response state of an SIP entity to which the message is transferred is added to the extended SIP message each time the message is transferred.

FIG. 11 is a diagram for explaining an example of an SIP Invite response that the SIP terminal 200b creates in response to the received SIP Invite request as indicated in FIG. 10 and sends it to the SIP proxy 100b. The extended SIP Invite response contains a response state 1101 of each SIP proxy 100 that relays the SIP Invite request and a response state 1102 judged and added by the SIP terminal 200b based on the resource usage of the apparatus itself.

FIG. 12 is a diagram for explaining an example of an SIP Invite response transferred from the SIP proxy 100b to the SIP proxy 100a. In principle, no "Conn-cont" header is newly added to the SIP message transferred as a response. However, the maintaining condition that the apparatus itself allows may be changed with reference to a response state 1201 of the sender SIP terminal 200b and set to a response 1202.

FIG. 13 is a diagram for explaining an example of an SIP Invite response transferred from the SIP proxy 100a to the SIP terminal 200a. In a similar manner to FIG. 12, the condition to which changes are made with reference to a response state 1301 of the SIP entity that has transferred the message may be set to a response state 1302.

Figure 14:
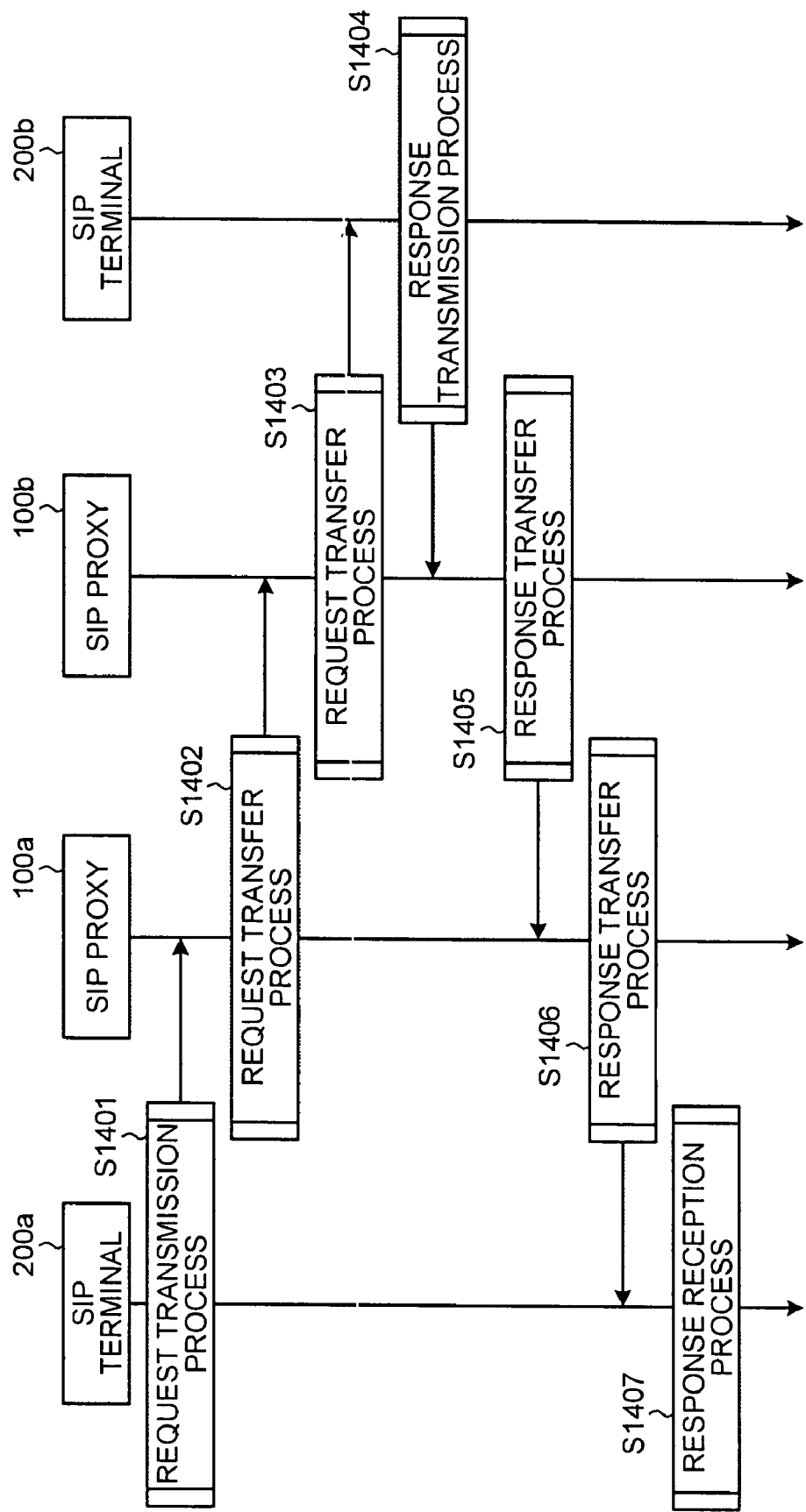
FIG. 14 is a flowchart of the entire message transmission/reception process according to the embodiment.

A message transmission/reception process executed by the SIP proxy 100 configured as above according to the embodiment is now explained with reference to FIG. 14.

In the following explanation, a text-messaging service being executed as an SIP application, where the SIP terminal 200a exchanges the SIP messages with the SIP terminal 200b for 500 times via the SIP proxies 100a and 100b, is introduced as an example. In other words, the SIP terminal 200a sends an SIP message containing a request for a TLS connection maintaining condition, requesting that all the TLS connections be maintained while the SIP message is transferred for 500 times.

In this example, the FQDNs of the SIP terminal 200a, the SIP proxy 100a, the SIP proxy 100b, and the SIP terminal 200b are "termA.example.com", "proxyA.example.com", "proxyB.example.com", and "termB.example.com", respectively. The SIP-URI of the user using the SIP terminal 200a (address of record (AoR)) is "userA@proxyA.example.com", and the contact address of this user is "userA@termA.example.com". The SIP-URI of the user using the SIP terminal 200b is "userB@proxyB.example.com", and the contact address of this user is "userB@termB.example.com".

The outline of the steps of the message transmission/reception process performed by the different SIP entities is described in FIG. 14, and the details thereof will be provided in FIG. 15 and later.

First, when the SIP application is implemented, a request transmission process is performed, where the SIP terminal 200a creates an SIP message that is to be sent to the SIP terminal 200b and sends it thereto (step S1401).

Then, a request transfer process is performed, where the SIP proxy 100a transfers the request sent by the SIP terminal 200a to the SIP proxy 100b (step S1402).

Another request transfer process is performed, where the SIP proxy 100b transfers the request received from the SIP proxy 100a to the SIP terminal 200b (step S1403). The sender and destination SIP entities (differ in the two request transfer processes at steps S1402 and S1403, but these processes perform basically the same function.

Then, a response transmission process is performed, where the SIP terminal 200b receives the request from the SIP proxy 100b, creates an SIP message as a response to the received request, and sends the message to the SIP proxy 100b (step S1404).

A response transfer process is performed next, where the SIP proxy 100b transfers the response sent by the SIP terminal 200b to the SIP proxy 100a (step S1405).

Another response transfer process is performed, where the SIP proxy 100a further transfers the response received from the SIP proxy 100b to the SIP terminal 200a (step S1406). The response transfer process at steps S1405 and step S1406 function basically in the same manner, although the sender and destination SIP entities differ.

Finally, a response reception process is performed, where the SIP terminal 200a receives the response from the SIP proxy 100a (step S1407), and the message transmission/reception process is terminated.

During the message transmission/reception process, the condition of maintaining the TLS connections is sequentially transferred by use of an extended SIP message so that each SIP entity maintains the TLS connections in accordance with the transferred maintaining condition. In other words, all the connections among the SIP entities in the SIP trapezoidal communication model can be maintained by the sender SIP terminal 200a sending the maintaining condition out.

The request transmission process performed by the SIP terminal 200a at step S1401 is now explained in detail with reference to FIG. 15.

The application unit 215 implements the application for the text-messaging service and causes the message processing unit 214 to create and send a request containing a connection maintaining condition request as a message to be sent to the SIP terminal 200b at the other end (step S1501).

More specifically, the application unit 215 refers to the information input through the user interface and causes the message processing unit 214 to create an SIP message that is addressed to a user whose SIP-URI is "userB@proxyB.example.com". In the following description, the SIP message sent from the SIP terminal 200a to the SIP terminal 200b may be designated as "request". The application unit 215 requests a condition for maintaining the TLS connections while the SIP message is being transferred for 500 times.

Next, the message processing unit 214 generates a request containing the maintaining condition request (step S1502). More specifically the message processing unit 214 constitutes an SIP message in accordance with the SIP protocol specifications. The message processing unit 214 determines that the destination of the SIP message is the SIP proxy 100a (proxyA.example.com).

The message processing unit 214 adds the option tag "CONN-STAT" as information indicating an extension to the "Require" and "Proxy-Require" headers of the request. The message processing unit 214 also describes an option parameter "conn-stat-req" designating a maintaining condition request in the SIP-URIs of the "Request-URI" and "To" header fields.

For instance, the message processing unit 214 designates a maintaining condition request such as "INVITE sips:

userB@proxyB.example.com; conn-stat-req=cont 500 Messages SIP/2.0;". A request as indicated in FIG. 8 is thereby produced.

Then, the determining unit 212 obtains the current resource usage state, such as memory usage, of the apparatus itself that is controlled by the resource controlling unit 111 (step S1503). The determining unit 212 determines whether the received connection maintaining condition can be satisfied in consideration of the obtained resource usage state (step S1504). For instance, the determining unit 212 determines that the maintaining condition cannot be satisfied when the pre-calculated memory capacity necessary for maintaining the TLS connections exceeds the currently available memory capacity.

When the connection maintaining condition cannot be satisfied (No at step S1504), the message processing unit 214 deletes the requested connection maintaining condition from the produced request (step S1505). More specifically, the message processing unit 214 deletes the extension option tag "CONN-STAT" and the parameter "conn-stat-req" designating the maintaining condition request from the header.

After deleting the maintaining condition request (step S1505), or when it is determined at step S1504 that the connection maintaining condition can be satisfied (Yes at step S1504), the transmitting unit 102 looks up the connection control table 124 to determine whether a TLS connection to the SIP proxy 100a is available (step S1506).

When there is no TLS connection (No at step S1506), the connection controlling unit 113 establishes a new TLS connection to the SIP proxy 100a (step S1507). More specifically, the transmitting unit 102 notifies the connection controlling unit 113 of the destination of the packet, the transaction ID, and the dialog ID, and the connection controlling unit 113 creates a TLS connection based on the received information. When creating the TLS connection, the connection controlling unit 113 registers the destination of the packet (the other end of the connection), the transaction ID, the dialog ID, and the like into the connection control table 124 in association with one another.

After the TLS connection is established, or when it is determined at step S1506 that there is a TLS connection (Yes at step S1506), the transmitting unit 102 sends the request produced at step S1502 to the SIP proxy 100a by way of this TLS connection (step S1508). More specifically, the transmitting unit 102 constitutes a packet transmittable into the network based on the request produced by the message processing unit 214, and sends the constituted packet to the SIP proxy 100a by way of the TLS connection.

The request transfer process performed by the SIP proxy 100a at step S1402 is now explained with reference to FIG. 16.

First, the receiving unit 101 receives the packet sent by the SIP terminal 200a, constitutes a request based thereon, and sends it to the message processing unit 114 (step S1601).

Next, the message processing unit 114 updates the header of the received request in accordance with the SIP protocol specifications, and produces a request that is to be transferred (step S1602). At this step, the message processing unit 114 determines that the SIP message is to be transferred to the SIP proxy 100b (proxyB.example.com).

Furthermore, the message processing unit 114 recognizes from the option tag "CONN-STAT" attached to the "Proxy-Require" header that the sender of the SIP message supports the extension according to the embodiment. When an SIP proxy that does not support the extension receives this SIP message, a response containing information that an inadaptable extension has been received ("420 Bad Extension", for example) is sent back to the SIP terminal 200a, and the transfer of the SIP message is not carried out.

Next, the message processing unit 114 obtains the maintaining condition request from the received request (step S1603). More specifically, the message processing unit 114 obtains the value of the "conn-stat-req" parameter from the received request. In the above example, the message processing unit 114 obtains "conn-stat-req=cont 500 Messages" indicating a request of maintaining the TLS connections while the SIP terminal 200a transmits and receives SIP messages for 500 times.

Then, the determining unit 112 obtains the current resource usage state, such as memory usage, of the apparatus itself that is controlled by the resource controlling unit 111 (step S1604). Based on the obtained resource usage state, the determining unit 112 determines whether the requested connection maintaining condition can be satisfied (step S1605).

The determination as to whether the TLS connections can be maintained should be made based on the judgment on whether both TLS connections to the transfer-source SIP terminal 200a and to the transfer-destination SIP proxy 100b can be maintained.

It should be noted, however, that, when all the SIP messages are transferred by way of a sole TLS connection between the SIP proxy 100a and the SIP proxy 100b, it is judged that the maintaining condition request is always fulfilled for this TLS connection.

When the maintaining condition is met, this means that the maintaining condition may be accepted as requested, or that the TLS connection may be allowed to be maintained by tightening the maintaining condition from the requested level.

When the connection maintaining condition is accepted (Yes at step S1605), the determining unit 112 determines an acceptable maintaining condition (step S1606). Then, the adding unit 114a adds the determined maintaining condition to the header of the request (step S1607). For example, when the requested condition is "conn-stat-req=cont 500 Messages", and when it is determined that the connections can be maintained under the condition as requested, the adding unit 114a adds a "Conn-cont" header such as "Conn-cont: SIP/2.0/TLS proxyA.example.com cont 500 Messages".

When it is determined at step S1605 that the connection maintaining condition cannot be satisfied (No at step S1605), the adding unit 114a adds the rejection information indicating that the requested maintaining condition is rejected, to the header of the request (step S1608). For instance, the adding unit 114a adds the rejection information described in such a form as "Conn-cont: SIP/2.0/TLS proxyA.example.com cont ng".

After the adding unit 114a adds either an acceptable maintaining condition or rejection information, the message processing unit 114 sends the constructed request to the transmitting unit 102.

The transmitting unit 102 constructs a packet that is transmittable to the network, from the received request, and sends it to the SIP proxy 100b (step S1609).

Figure 15:
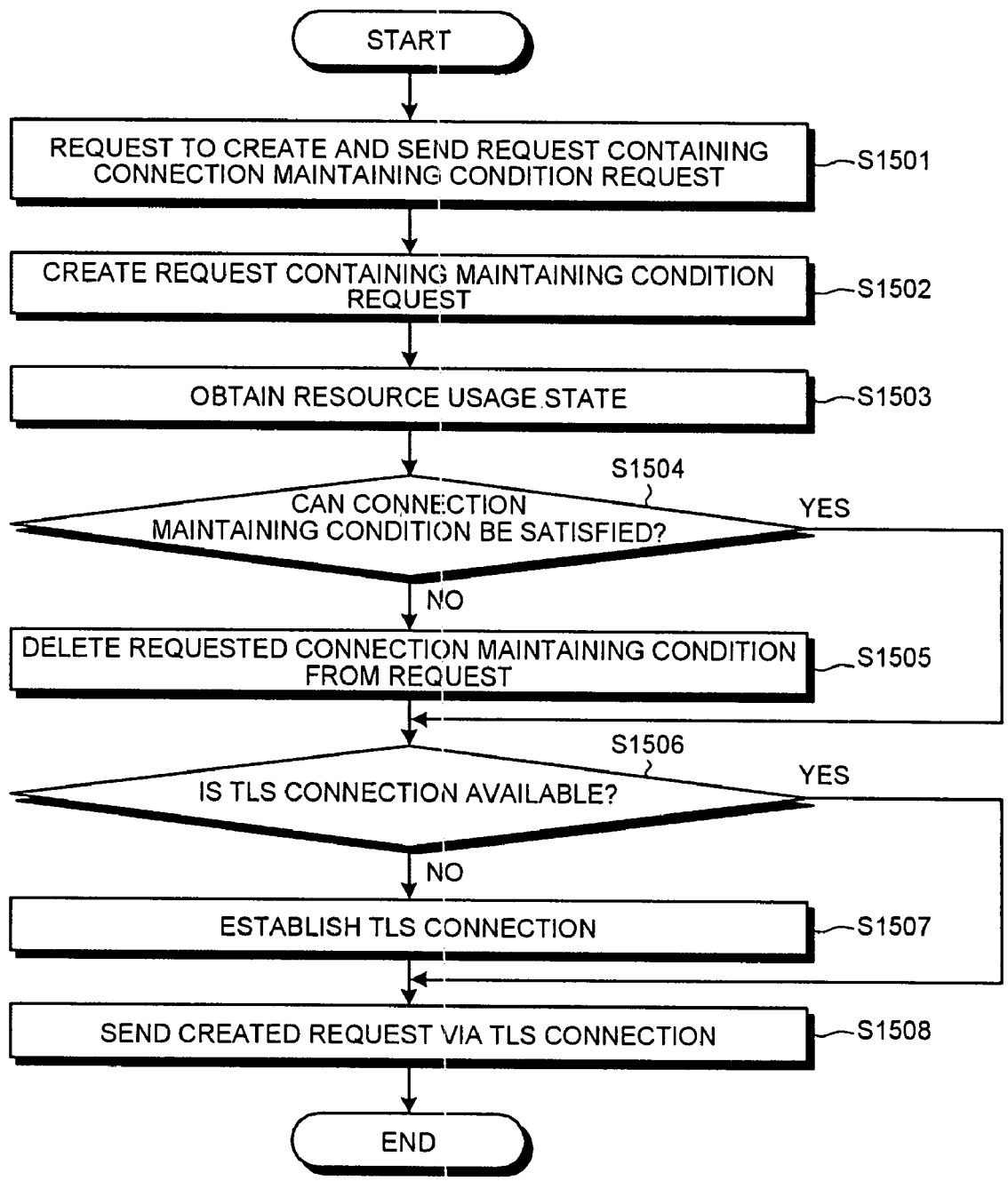
FIG. 15 is a flowchart of the entire request transmission process.

At this point, if there is no TLS connection to the SIP proxy 100b, the connection controlling unit 113 newly establishes a TLS connection in the same manner as step S1507 in FIG. 15.

In general, because the TLS connection between the SIP proxy 100a and the SIP proxy 100b plays an important role in operating the SIP system, the connection is controlled to be maintained all the time in many cases.

Figure 16:
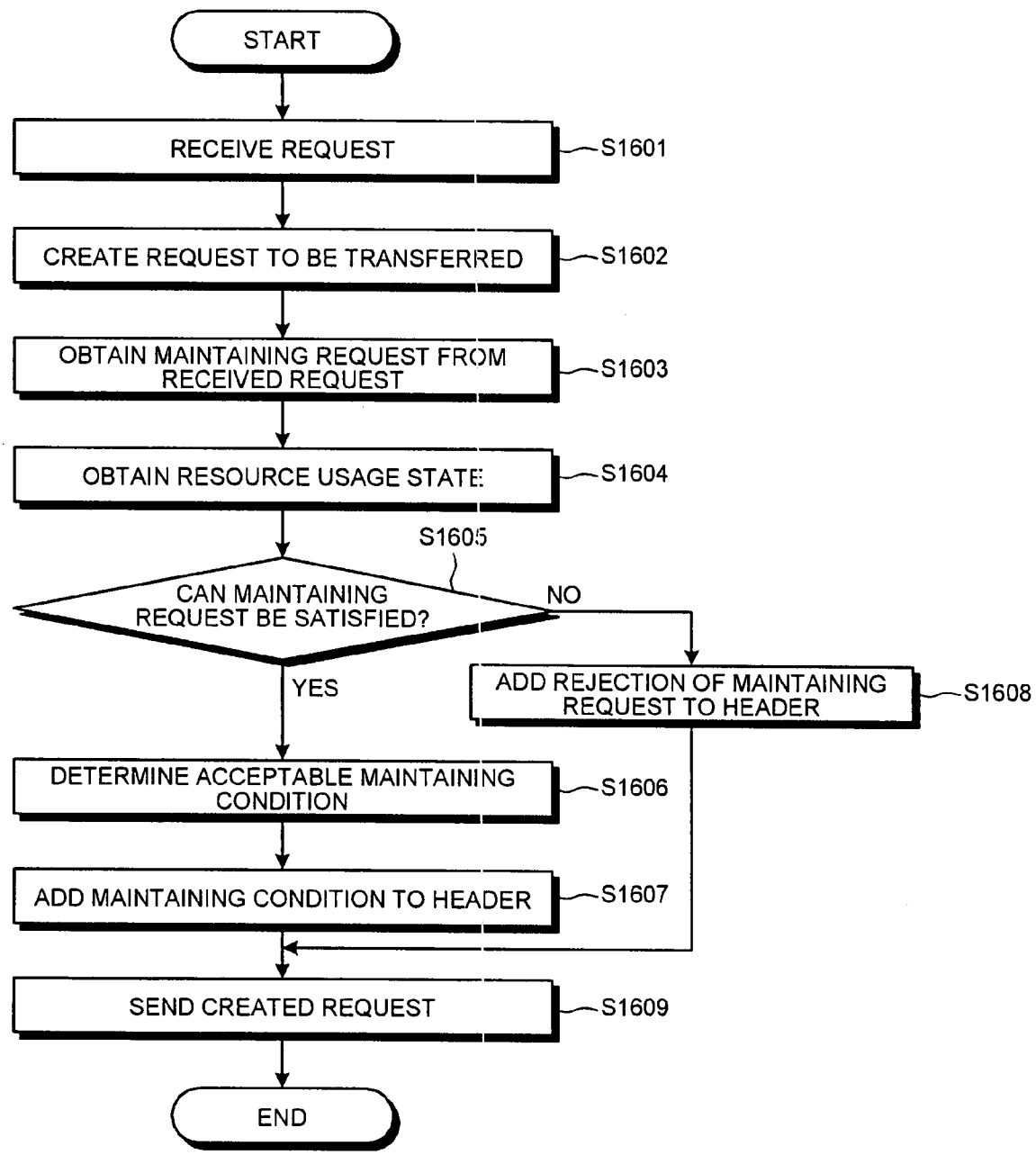
FIG. 16 is a flowchart of the entire request transfer process.

The request transfer process executed by the SIP proxy 100b at step S1403 is essentially the same as the flowchart presented in FIG. 16. However, the processes differ in the following points.

First, a difference is in that the receiver of the packet is the SIP proxy 100a, and the destination of the packet is the SIP terminal 200b.

Moreover, when the determining unit 112 determines whether the maintaining condition request for the TLS connections is acceptable, the determination is made in consideration of: (A) the resource usage state controlled by the resource controlling unit 111; (B) the value of the "conn-stat-req" parameter; and also (C) the "Conn-cont" header information added by the SIP proxy 100a.

The information (C) allows the determining unit 112 to determine whether the SIP entities (in this example, SIP proxy 100a only) located toward the sender SIP terminal (the SIP terminal 200a in this example) with respect to the apparatus itself responded that the TLS connections can be maintained under the maintaining condition indicated by the "conn-stat-req" parameter, as requested by the sender SIP terminal 200. In other words, the determining unit 112 can acquire the information indicating whether all the TLS connections through which the SIP message has been passed would be maintained.

Figure 17:
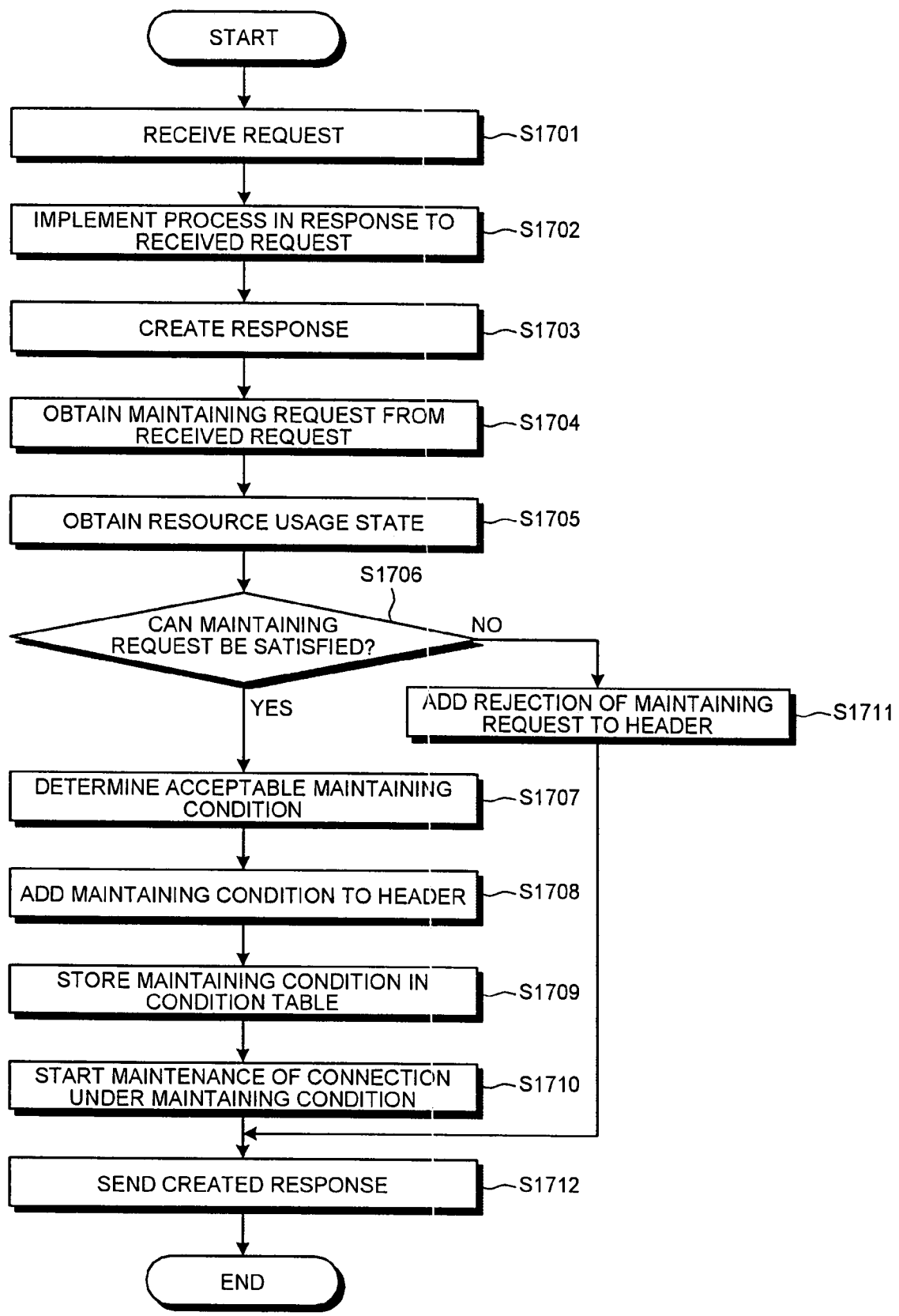
FIG. 17 is a flowchart of the entire response transmission process.

The response transmission process performed by the SIP terminals 200b at step S1404 is explained in detail with reference to FIG. 17.

The receiving unit 101 receives a packet that corresponds to the SIP message transmitted by the SIP proxy 100b, constructs a request, and sends it to the message processing unit 214 (step S1701).

The message processing unit 214 interprets the received SIP message in accordance with the SIP protocol specifications, and provides the application unit 215 with the text message information based on the interpretation result. Then, the application unit 215 implements an application for the user in response to the received request (step S1702).

In response to the request from the application unit 215, the message processing unit 214 creates a response, which is an SIP message to be sent back to the SIP terminal 200a (step S1703). The response created by the message processing unit 214 includes all the "Conn-cont" headers contained in the received request, as they are.

The message processing unit 214 obtains the request for the condition of maintaining the TLS connections from the received request (step S1704). More specifically, the message processing unit 214 recognizes from the option tag "CONN-STAT" added to the "Require" header that the sender of the SIP message supports the extension according to the embodiment.

When an SIP terminal that does not support the extension receives the SIP message, a response containing information indicating that an inadaptable extension has been received ("420 Bad Extension", for example) is sent back to the SIP terminal 200a, and the transfer of the SIP message is not carried out.

The message processing unit 214 obtains the requested maintaining condition for the TLS connections from the value of the "conn-stat-req" parameter. In the above example, the message processing unit 214 obtains "conn-stat-req=cont 500 Messages", which indicates a request for maintaining TLS connections while the SIP terminal 200a receives and transmits SIP messages for 500 times.

The SIP terminal 200b obtains from the value of the "Conn-cont" header the response state of all the other SIP entities to which the SIP message has been transferred.

Next, the determining unit 212 obtains the current resource usage state, such as memory usage, of the apparatus itself that is controlled by the resource controlling unit 111 (step S1705). The determining unit 212 determines from the obtained resource usage state whether the requested connection maintaining condition can be satisfied (step S1706). At this point, the determination by the determining unit 212 is made in consideration of the value of the "Conn-cont" header, which indicates the response state of other SIP entities.

When the connection maintaining condition can be satisfied (Yes at step S1706), the determining unit 212 determines an acceptable maintaining condition (step S1707). Then, the adding unit 214a adds the determined maintaining condition to the header of the response (step S1708).

Thereafter, the determining unit 212 stores the determined maintaining condition in the corresponding condition table (step S1709). For instance, when the maintaining condition is defined by the number of messages such as "conn-stat-req=cont 500 Messages", the determining unit 212 stores in the message number condition table 123 the address and the port number of the SIP proxy 100b as the connection destination, and "500 Messages" as the SIP message number condition.

The maintaining unit 113a starts the maintenance of the TLS connections under the determined maintaining condition (step S1710).

When it is determined at step S1706 that the connection maintaining condition cannot be satisfied (No at step S1706), the adding unit 214a adds to the header of the response the rejection information indicating that the requested maintaining condition is rejected (step S1711).

After the adding unit 214a adds either the acceptable maintaining condition or the rejection information, the message processing unit 214 sends the constructed response to the transmitting unit 102.

The transmitting unit 102 constructs, from the received response, a packet that is transmittable to the network, and sends it to the SIP proxy 100b (step S1712).

The response transfer process performed by the SIP proxy 100b at step S1405 is explained in detail with reference to FIG. 18.

The receiving unit 101 receives the packet from the SIP terminal 200b, constructs a response, and sends it to the message processing unit 114 (step S1801).

The message processing unit 114 updates the header of the received request in accordance with the SIP protocol specifications, and produces a response to be transferred (step S1802). At this point, the message processing unit 114 determines that the SIP message is to be transferred to the SIP proxy 100a (proxyA.example.com).

The message processing unit 114 obtains a maintaining condition request from the received response (step S1803). More specifically, the message processing unit 114 obtains the values for the "conn-stat-req" parameter and the "Conn-cont" header from the received response. At this step, the SIP proxy 100b can recognize the response state regarding all the TLS connections that are used to transfer the SIP message, from the obtained value of the "Conn-cont" header.

Next, the determining unit 112 determines whether the maintaining condition should be changed, based on the obtained maintaining condition request and the response state from other SIP entities (step S1804). In other words, the determining unit 112 may change the maintaining condition determined at the time of transferring the request to make it agree with the response of the SIP terminal 200b.

For instance, the time condition determined when transferring the request is a 1200-second maintenance. However, if a response of the SIP terminal 200*b* is a time condition of 3600 seconds, the determining unit 112 may change the condition to 3600 seconds to make it agree with the SIP terminal 200*b*. Similarly, if the time condition determined when transferring the request is a 3600-second maintenance but a response of the SIP terminal 200*b* is a time condition of 1200 seconds, the determining unit 112 may change the condition to 1200 seconds to make it agree with the SIP terminal 200*b*.

When determining to change the maintaining condition (Yes at step S1804), the determining unit 112 makes a change to the maintaining condition (step S1805). Then, the adding unit 114*a* adds the changed maintaining condition to the header of the response (step S1806).

When the determining unit 112 determines not to change the maintaining condition (No at step S1804), or when the adding unit 114*a* adds the maintaining condition (step S1806), the determining unit 112 stores the determined maintaining condition in the corresponding condition table (step S1807). Further, the maintaining unit 113*a* starts the maintenance of the TLS connections under the determined maintaining condition (step S1808). Here, the content of the "Conn-cont" header described as the maintaining condition finally matches the actual TLS connection maintaining period.

Next, the transmitting unit 102 constructs a packet that is transmittable to the network from the response received from the message processing unit 114, and sends it to the SIP proxy 100*a* (step S1809).

Figure 18:
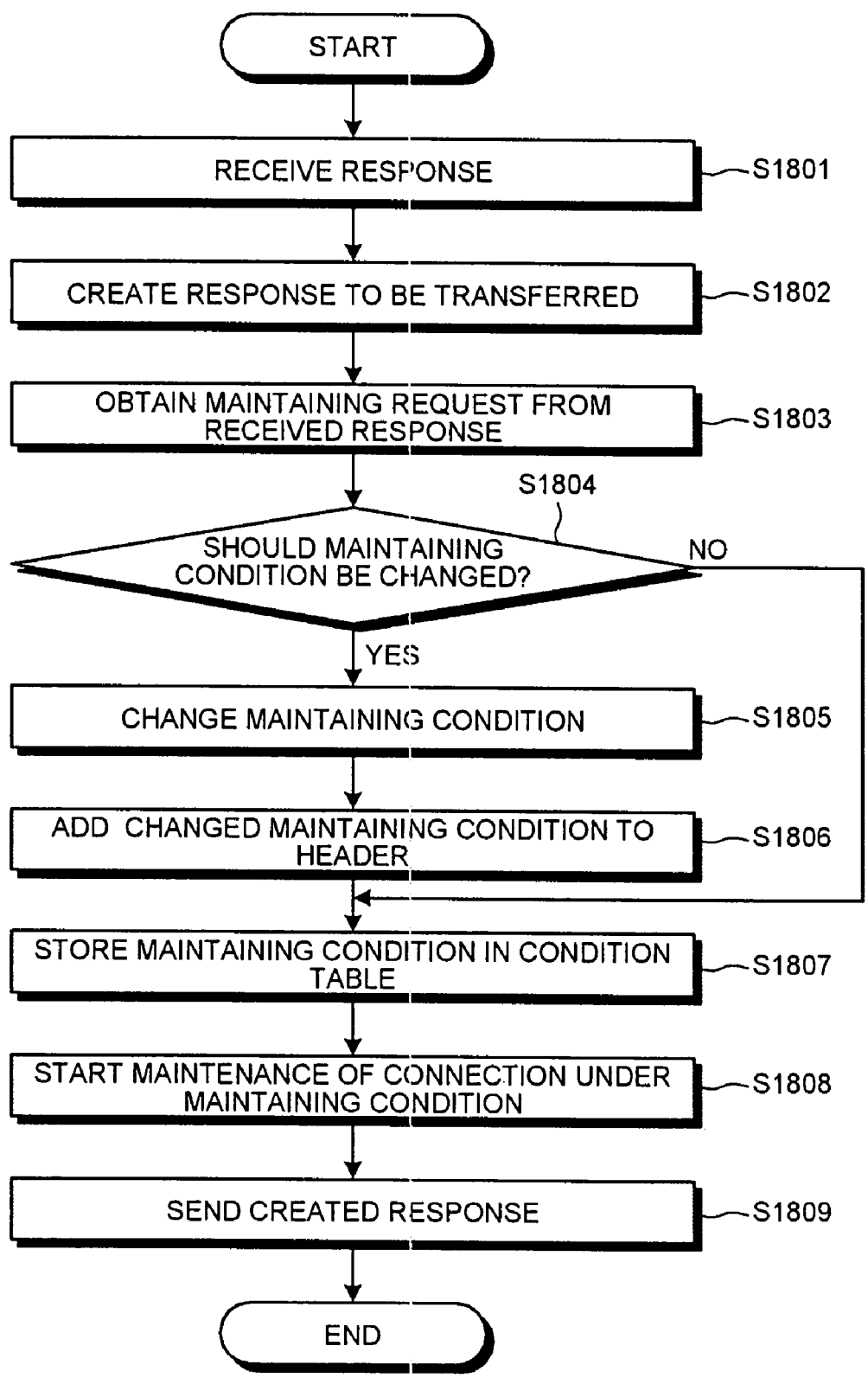
FIG. 18 is a flowchart of the entire response transfer process.

The response transfer process executed by the SIP proxy 100*a* at step S1406 is basically the same as the flowchart of FIG. 18, except for the following points.

First, a difference is in that the receiver of the packet is the SIP proxy 100*b*, and the destination of the packet is the SIP terminal 200*a*.

In addition, when the determining unit 112 makes a determination on a change to the maintaining condition, the information of the "Conn-cont" header that has been changed by the SIP proxy 100*a* is taken into consideration.

In other words, the determining unit 112 can update the actual TLS maintaining period of the apparatus itself with reference to the TLS connection maintaining period actually maintained by the SIP entities (the SIP proxy 100*b* and the SIP terminal 200*b* in this example) located toward the SIP terminal (SIP terminal 200*b* in this example) with respect to the apparatus itself.

Figure 19:
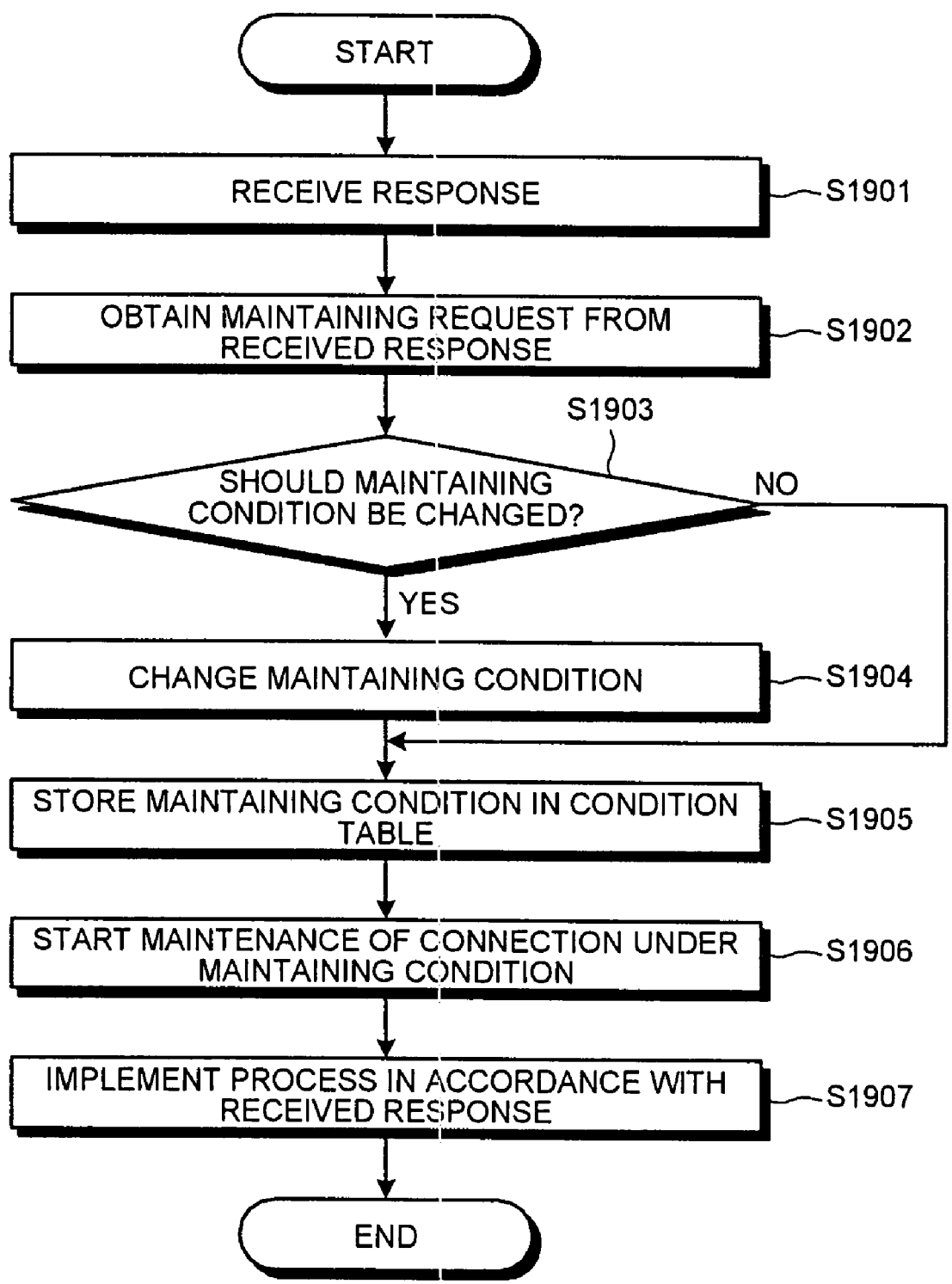
FIG. 19 is a flowchart of the entire response reception process.

Next, the response reception process executed by the SIP terminal 200*a* at step S1407 is explained with reference to FIG. 19.

The receiving unit 101 receives a packet transmitted by the SIP proxy 100*a* and constructs a response, and sends it to the message processing unit 214 (step S1901).

Next, the message processing unit 214 interprets the received response in accordance with the SIP protocol specifications, and obtains a maintaining condition request (step S1902). More specifically, the message processing unit 214 obtains the value of the "Conn-cont" header from the received response. The SIP terminal 200*a* thereby ascertains the response state regarding the maintenance of all the TLS connections that are used in transferring the SIP messages.

Based on the obtained response state from other SIP entities, the determining unit 212 determines whether the maintaining condition should be changed (step S1903).

For instance, the SIP terminal 200*a* may have a structure such that, when any of the SIP entities (the SIP terminal 200*b*, the SIP proxy 100*b*, and the SIP proxy 100*a* in this example) closer to the destination of the message than the apparatus itself responds that the maintaining request cannot be satisfied, the SIP terminal 200*a* determines to change the maintaining condition so that the maintaining request is also not satisfied.

More specifically, the SIP terminal 200*a* can make a determination that the TLS connection between the SIP proxy 10*a* and the SIP terminal 200*a* is maintained, for example, only when the maintaining condition requests are accepted for both two TLS connections between the SIP terminal 200*b* and the SIP proxy 100*b* and between the SIP proxy 100*b* and the SIP proxy 100*a*.

Furthermore, another embodiment can be such that, even if either one or both of the above maintaining condition requests is unacceptable, a determination may be made that the TLS connection between the SIP proxy 100*a* and the SIP terminal 200*a* should be maintained.

When determining that the maintaining condition should be changed (Yes at step S1903), the determining unit 212 changes the maintaining condition (step S1904).

When determining that the maintaining condition should not be changed (No at step S1903), the determining unit 212 stores the determined maintaining condition into the corresponding condition table (step S1905). Furthermore, the maintaining unit 113*a* starts the maintenance of the TLS connections under the determined maintaining condition (step S1906).

In this manner, the request for maintaining the TLS connections is satisfied as indicated by the "Conn-cont" header contained in the SIP message. However, if the resource controlling unit 111 of an SIP entity determines that its calculation resource becomes too tight to maintain the TLS connections, there is a possibility that any of the TLS connections held on the connection control table 124 is canceled.

Thereafter, if necessary, the application unit 215 is notified of the data included in the response, where a process is executed in accordance with the response (step S1907).

Figure 20:
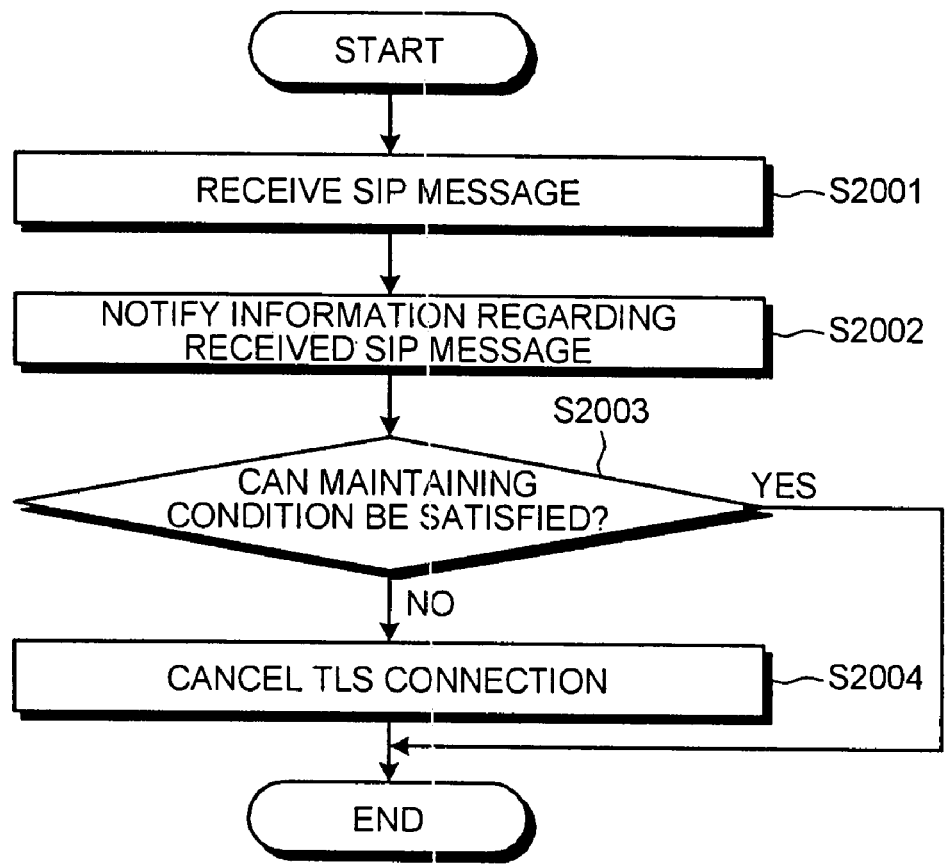
FIG. 20 is a flowchart of the entire connection control process.

Next, the connection control process executed by each SIP entity configured in the above manner according to the embodiment is explained with reference to FIG. 20.

The connection control process indicates a process in which, when the SIP message is transferred by way of the TLS connection for which the maintaining condition request is accepted, each SIP entity makes a judgment on the maintaining condition to control the continuation/cancellation of the TLS connection. The connection control process executed by the SIP terminal 200 is explained below, but the SIP proxy 100 also performs the connection control process, following the same steps.

First, the receiving unit 101 of the SIP terminal 200 forms an SIP message from a received packet, and sends the message to the message processing unit 214 (step S2001). Next, the message processing unit 214 processes the SIP message in accordance with the SIP protocol specifications and the extension specifications described in the embodiment. Then, the message processing unit 214 notifies the determining unit 212 of information relating to the TLS connection maintaining condition (step S2002).

For instance, when the TLS connection is maintained under the SIP message number condition, the message processing unit 214 notifies the determining unit 212 of the number of transferred SIP messages. When the TLS connection is maintained under the SIP method condition, the message processing unit 214 notifies the determining unit 212 of the SIP method that is used. When the TLS connection is maintained under the time condition, the message processing unit 214 notifies the determining unit 212 of the elapsed time.

The determining unit 212 may be configured to hold a timer to make a judgment on a period of maintaining the TLS connection.

When receiving the notification, the determining unit 212 determines whether the maintaining condition can be satisfied with reference to the condition tables (step S2003). When the maintaining condition cannot be satisfied (No at step S2003), the determining unit 212 notifies the connection controlling unit 113 of the cancellation of a TLS connection. Then, the canceling unit 113b cancels the TLS connection as notified (step S2004). However, if this TLS connection is shared with other dialogs or the like, the TLS connection is maintained. This case holds, for instance, when all the SIP messages are transferred between the SIP proxies 100a and 100b by way of a sole TLS connection.

When the maintaining condition is to be satisfied (Yes at step S2003), the connection control process is terminated without canceling the TLS connection.

The server apparatus according to the embodiment receives from an SIP terminal a message containing a maintaining condition for requesting the continuation of the connections, and determines whether the requested maintaining condition is acceptable based on the resource usage state of the apparatus itself. The server apparatus then transfers the determination result to an external SIP proxy, which is a relaying destination of the message. Whether the maintaining condition is acceptable is determined in further consideration of the response state of the external SIP proxies and the receiver SIP terminal with regard to the requested maintaining condition, thereby maintaining or canceling the connections.

Hence, the connections in the entire system can be suitably maintained in response to the request from an application running on a terminal.

Figure 21:
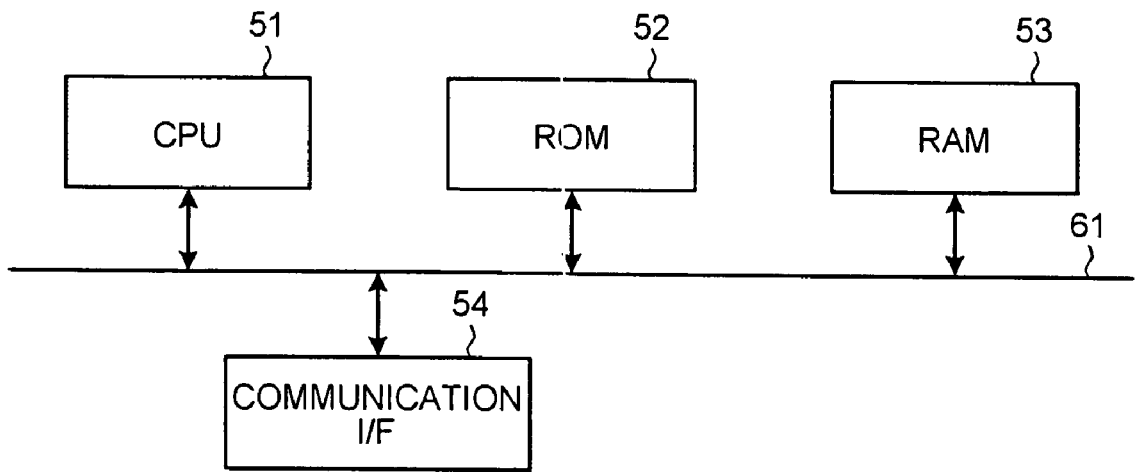
FIG. 21 is an explanatory diagram illustrating a hardware structure of the server apparatus according to the embodiment.

The hardware structure of the server apparatus or the terminal apparatus according to the embodiment is explained with reference to FIG. 21.

The server apparatus or the terminal apparatus according to the embodiment includes a controlling device such as the CPU 51, a memory device such as the read only memory (ROM) 52 and the RAM 53, the communication I/F 54 connected to the network to conduct communications, an external memory device such as a hard disk drive (HDD) and a compact disc (CD) drive, a displaying device such as a display, an inputting device such as a keyboard and a mouse, and the bus 61 connecting these components. The server apparatus has a hardware structure adopting a regular computer.

A server program executed by the server apparatus according to the embodiment is recorded in the form of an installable or executable file on a recording medium that is readable on a computer, such as a compact disk read only memory (CD-ROM), a flexible disk (FD), a compact disk recordable (CD-R), and a digital versatile disk (DVD).

A server program executed on the server apparatus according to the embodiment may be stored on a computer connected to a network such as the Internet and downloaded by way of the network. The server program executed on the server apparatus according to the embodiment may be provided or distributed by way of a network such as the Internet.

Otherwise, the server program according to the embodiment may be offered in the form of a ROM or the like in which the program is recorded in advance.

The server program executed on the server apparatus according to the embodiment has a structure of a module including the aforementioned components (the receiving unit, the transmitting unit, the resource controlling unit, the determining unit, the connection controlling unit, and the message processing unit). As the actual hardware, the CPU 51 (processor) reads the server program from the recording medium and executes the program so that the components are loaded and generated onto the main memory device.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A server apparatus that maintains a connection between a first terminal and a second terminal, transmits a message received from the first terminal to the second terminal by way of a relaying device, receives a message transmitted from the second terminal by way of the relaying device, and transmits the message to the first terminal, the server apparatus comprising:
a resource controlling unit configured to control a resource usage state;
a receiving unit configured to receive from the first terminal a first message containing a first condition for maintaining the connection between the first terminal and the second terminal;
a determining unit configured to determine a second condition to be accepted to maintain the connection, based on the first condition contained in the received first message and the resource usage state;
an adding unit configured to add the second condition to the first message;
a transmitting unit configured to transmit the first message to which the second condition is added, to the relaying device to transmit the first message to the second terminal; and
a maintaining unit configured to maintain the connection under the determined second condition.

2. The apparatus according to claim 1, wherein
the receiving unit is further configured to receive from the relaying device a second message containing a third condition for maintaining the connection;
the determining unit is further configured to determine the second condition based on the third condition contained in the received second message and the resource usage state;
the adding unit is further configured to add the second condition to the second message; and
the transmitting unit is further configured to transmit the second message to which the second condition is added, to the first terminal.

3. The apparatus according to claim 1, wherein
the receiving unit is further configured to receive from the relaying device a third message containing a fourth condition requested for maintaining the connection by at least either one of the relaying device and the second terminal, the third message being transmitted by the second terminal in response to the first message; and
the determining unit is configured to change the second condition based on the fourth condition contained in the received third message and the resource usage state.

4. The apparatus according to claim 3, wherein the determining unit is configured to determine either one of the fourth condition contained in the received third message and the first condition contained in the first message as the second condition.

5. The apparatus according to claim 3, wherein
the receiving unit is further configured to receive from the relaying device the third message containing first rejection information indicating that maintenance of the connection is rejected; and
the determining unit is configured to change the second condition based on the first rejection information contained in the received third message and the resource usage state.

6. The apparatus according to claim 5, wherein the determining unit is configured to determine that the maintenance of the connection under the first condition is rejected when the third message contains the first rejection information, and to determine to adopt the second condition when the third message does not contain the first rejection information.

7. The apparatus according to claim 1, wherein
the determining unit is configured to determine whether maintenance of the connection under the first condition is rejected based on the first condition contained in the received first message and the resource usage state, and to determine to adopt the second condition when the maintenance is not rejected;
the adding unit is configured to add to the first message second rejection information indicating that the maintenance of the connection under the first condition is rejected when the determining unit determines that the maintenance of the connection is rejected; and
the transmitting unit is configured to transmit to the relaying device the first message to which the second rejection information is added.

8. The apparatus according to claim 1, wherein the receiving unit is configured to receive the first condition requesting to maintain the connection until a predetermined fourth message is received.

9. The apparatus according to claim 1, wherein the receiving unit is configured to receive the first condition requesting to maintain the connection until a predetermined first period of time elapses.

10. The apparatus according to claim 1, wherein the receiving unit is configured to receive the first condition requesting to maintain the connection until number of message transmissions/receptions exceeds a predetermined first threshold value.

11. The apparatus according to claim 1, wherein the determining unit is configured to determine the second condition accepting to maintain the connection until a predetermined fifth message is received.

12. The apparatus according to claim 1, wherein the determining unit is configured to determine the second condition accepting to maintain the connection until a predetermined second period of time elapses.

13. The apparatus according to claim 1, wherein the determining unit is configured to determine the second condition accepting to maintain the connection until number of message transmissions/receptions exceeds a predetermined second threshold value.

14. The apparatus according to claim 1, wherein
the receiving unit is configured to receive from the first terminal, as the first message, an session initiation protocol (SIP) message, which is a message transmitted/received in accordance with SIP and has a header including the first condition requesting to maintain a transport layer security (TLS) connection in accordance with TLS protocols; and
the adding unit is configured to add the second condition to the header of the SIP message.

15. A connection maintaining method used for a server apparatus that maintains a connection between a first terminal and a second terminal, transmits a message received from the first terminal to the second terminal by way of a relaying device, receives a message transmitted from the second terminal by way of the relaying device, and transmits the message to the first terminal, the method comprising:
controlling a resource usage state;
receiving from the first terminal a first message containing a first condition for maintaining the connection between the first terminal and the second terminal;
determining a second condition to be accepted to maintain the connection, based on the first condition contained in the received first message and the resource usage state;
adding the second condition to the first message;
transmitting the first message to which the second condition is added, to the relaying device to transmit the first message to the second terminal; and
maintaining the connection under the determined second condition.

16. A terminal apparatus that communicates with an external terminal by a connection maintained to transmit a message to the external terminal by way of a relaying device, the terminal apparatus comprising:
a resource controlling unit configured to control a resource usage state;
a determining unit configured to determine a first condition to be accepted to maintain a connection for transmitting a message to and from the external terminal, based on the resource usage state;
a transmitting unit configured to transmit a first message containing the determined first condition to the relaying device; and
a receiving unit configured to receive from the relaying device a second message containing a second condition requested for maintaining the connection by at least either one of the external terminal and the relaying device, the second message being transmitted by the external terminal in response to the first message, wherein
the determining unit is further configured to determine the first condition based on the received second condition and the resource usage state.

* * * * *